Dec. 14, 1926.

G. PEGARIEK

HAY WAGON

Filed March 14, 1925 2 Sheets-Sheet 1

1,610,582

INVENTOR
G. PEGARIEK
BY Munn & Co.
ATTORNEYS

Dec. 14, 1926.  1,610,582
G. PEGARIEK
HAY WAGON
Filed March 14, 1925    2 Sheets-Sheet 2
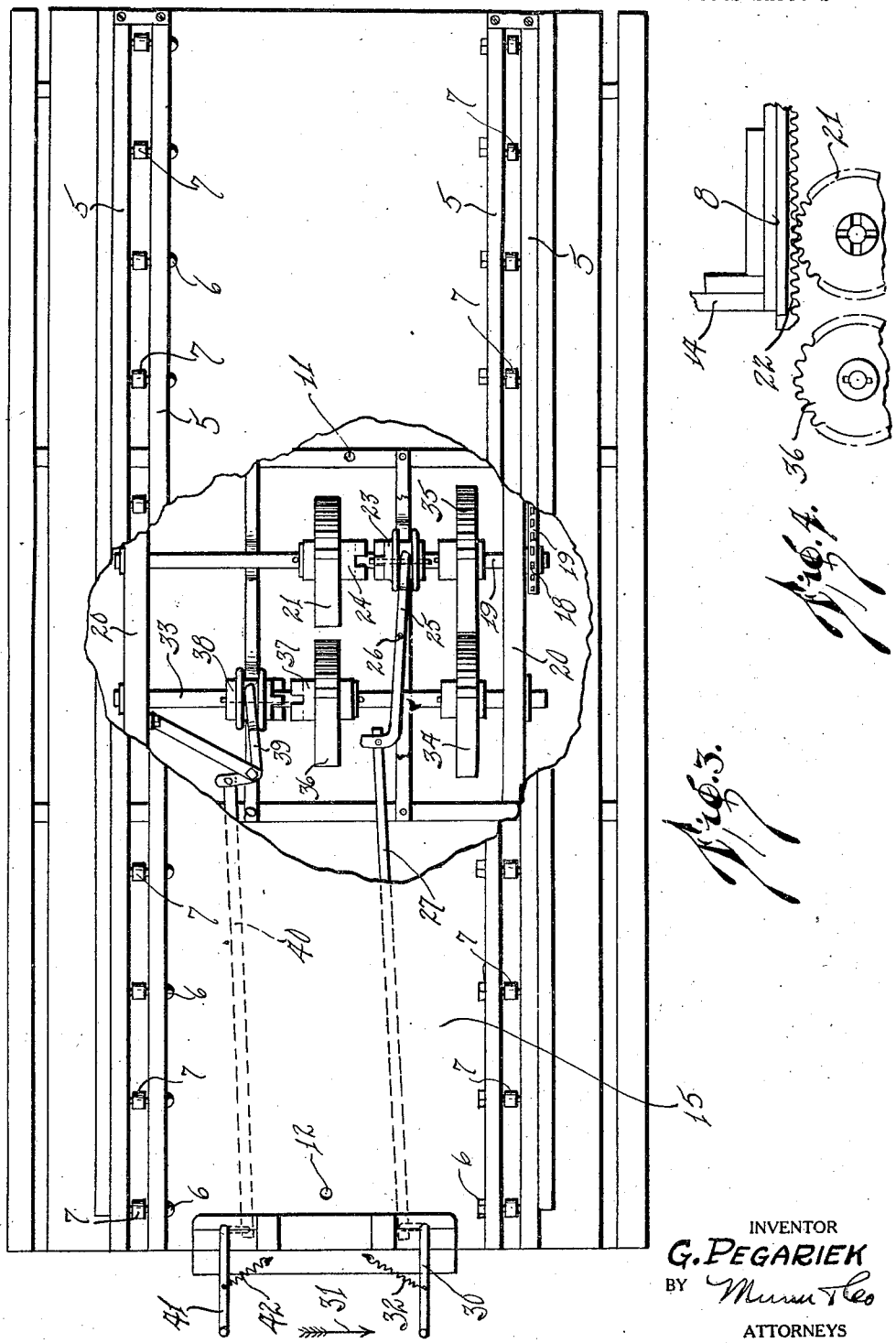
INVENTOR
G. PEGARIEK
BY
ATTORNEYS Patented Dec. 14, 1926.

1,610,582

UNITED STATES PATENT OFFICE.

GEORGE PEGARIEK, OF OXFORD JUNCTION, IOWA.

HAY WAGON.

Application filed March 14, 1925. Serial No. 15,645.

My invention relates to improvements in hay wagons, and particularly the type intended for use with a traction driven hay loader, and it consists in the combinations, constructions, and arrangements herein described and claimed.

An object of my invention is to provide a hay wagon of the character described in which the entire load of the wagon may be deposited at the rear portion of the wagon, thereby eliminating the necessity of an extra man to pitch the hay from the rear portion of the wagon to the forward portion for half of the load.

A further object of my invention is to provide a hay wagon of the character described in which the power for moving part of the load from the rear portion to the fore portion of the wagon is that power employed for drawing the wagon, which may be horses or a tractor, as desired.

A further object of my invention is to provide a hay wagon of the character described in which means is provided for actuation of the moving hay-supporting platform in either direction when the wagon is moving forward or to the rear.

A further object of my invention is to provide a hay wagon of the character described which greatly facilitates the unloading of the wagon with a hay fork or by manual delivery.

A further object of my invention is to provide a hay wagon of the character described which is durable, easily operated and thoroughly practical for the purpose intended.

Other objects and advantages will appear in the following specification, and the novel features of the invention will be particularly pointed out in the appended claims.

My invention is illustrated in the accompanying drawings forming part of this application, in which—

Figure 3, is an enlarged plan view of a part of the wagon illustrated in Figure 1 with portions broken away, and Figure 4 is an enlarged sectional view substantially along the line 4—4 of Figure 2.

Figure 1:
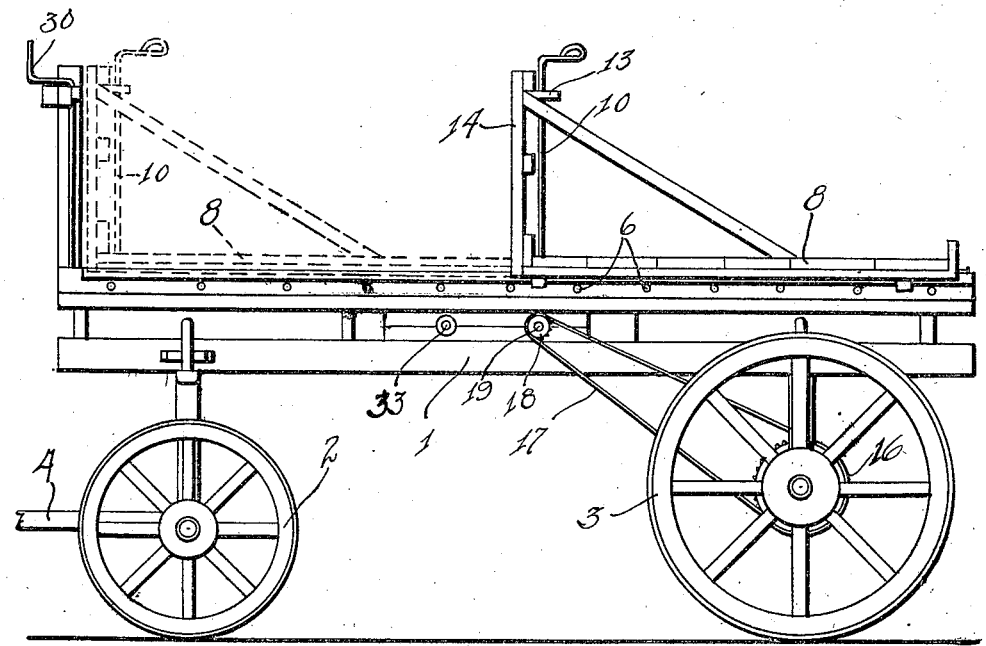
Figure 1 is a side elevation of an embodiment of my invention.
Figure 2:
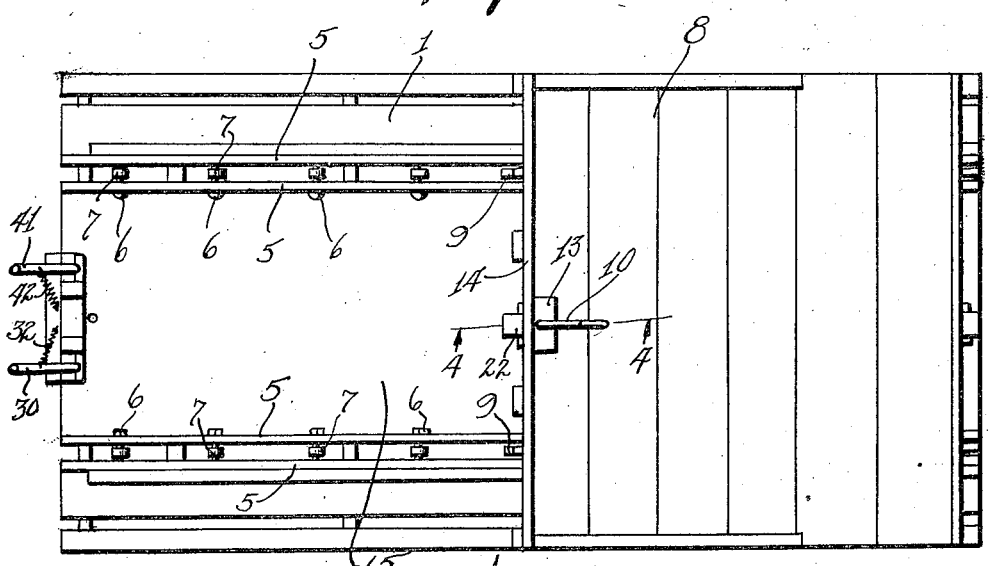
Figure 2 is a top plan view of the wagon illustrated in Figure 1.

In carrying out my invention I make use of a chassis 1 having fore wheels 2, and rear wheels 3. The chassis 1 is provided with a tongue 4 by means of which it may be drawn by a team or attached to a tractor or other means of locomotion.

A plurality of longitudinal strips 5 arranged in pairs, one set on either side of the central portion of the chassis, extend from the forward end to the rear end thereof. These strips serve as means for supporting transverse shafts 6 extending therebetween upon which rollers 7 are rotatably disposed.

A moving platform 8 which is as wide as the chassis 1 and substantially one-half the length of the chassis is slidably disposed and supported upon the rollers 7 by the provision of runners 9 which extend longitudinally of the platform 8 and which are secured to the under side thereof. The strips 5 serve as means for preventing lateral movement of the platform, since the rollers 7 lie beneath the plane of the upper surface of the strips 5.

Means for locking the platform 8 in the position shown in Figure 1 in full lines or in the position shown in dotted lines, is provided in a locking pin 10 which extends vertically from the central forward part of the platform 8 and which is adapted for projection into vertical bores 11 and 12 in the frame of the chassis 1 adjacent to the rear of the forward end thereof respectively. The locking pin 10 is secured against lateral displacement at its upper end by the provision of a bearing member 13 which is secured to a front panel 14 carried by the platform. The purpose of this panel 14 is to prevent hay disposed upon the platform 8 from falling over on to the forward part of the chassis when the platform is disposed in the position shown in full lines in Figure 1.

A metal apron 15 is disposed upon the frame of the chassis 1 immediately beneath the strips 5 for the purpose of providing a supporting surface upon which hay may be disposed and to prevent the load from falling through the openings in the frame and from falling into the platform operating mechanism hereinafter described.

Means for moving the platform 8 to the position shown in full lines in Figure 1 or in the position shown in dotted lines as the chassis is moved along in either direction is provided in a sprocket wheel 16 carried by one of the wheels 3. This sprocket wheel is connected by means of a chain 17 to a sprocket wheel 18 disposed upon a shaft 19. The shaft 19 is rotatably mounted upon two of the longitudinal supports 20 of the chassis frame 1. A pinion 21 is feathered upon the shaft 19 and lies in registration with the central portion of the chassis. A toothed rack 22 is secured to the under side of the platform 8 as shown in Figure 4. A clutch member 22 is slidably disposed upon the shaft 19 adjacent to the pinion 21. A complementary clutch member 24 is formed integral with the hub portion of the pinion 21. A bifurcated lever arm 25 is pivotally supported at 26 upon the chassis frame with the bifurcated portion in engagement with the clutch member 23. A connecting rod 27 is attached at 28 to the lever 25 at one end and to the lowermost end of a crank arm 30 at the opposite end.

Thus when the crank arm 30 is moved in the direction of the arrow 31 against the force of a tension spring 32 connected to the crank arm 30 and to the chassis, the clutch member 23 is moved into engagement with the clutch member 24 and the pinion 21 is caused to rotate in the same direction as the rear wheels 3 of the chassis from which the pinion is driven. Thus the platform 8 must move toward the front of the chassis 1, provided, of course, the crank arm 30 is held against the force of the spring 32 until the platform assumes this position. Means for safeguarding against the movement of the platform 8 beyond its proper limit of travel consists in the disposition of the rack 21 upon the platform in such a manner as to cause the rack to run off of the pinion when the platform has reached the limit of its travel.

Means for moving the platform from the position shown in dotted lines to the position shown in full lines is provided in a second shaft 33 rotatably mounted in front and parallel with the shaft 19 upon the frame members 20. This shaft has a gear 34 thereon which is at all times in mesh with a gear 35 carried by the shaft 19. A pinion 36 identical in construction with the pinion 21 is rotatably disposed upon the shaft 23. The pinion 36 has a complementary clutch member 37 formed integral therewith similar to the clutch member 24.

A clutch member 38 identical to the clutch member 23 is carried upon the shaft 33 and feathered thereto. A lever 39 corresponding to the lever 28 is arranged to engage with the clutch member 38 and is connected by means of a connecting rod 40 to a crank arm 41 identical to the crank arm 30.

When the crank arm 41 is moved in a direction opposite to the arrow 31 and against the action of a spring 42 which is secured to the crank arm and to the chassis, the clutch member 38 will engage with the clutch member 37 and the pinion 36 will revolve in a direction opposite to that of the rear wheel 31 from which it is driven.

Thus when the platform is at the forward end of the chassis and the crank arm 41 is actuated, the platform will be moved toward the rear of the vehicle until the rack 22 disengages from the pinion 36, whereupon further movement of the platform may only be accomplished by actuation of the lever arm 30 which will move the platform forward again.

From the foregoing description of the various parts of the device the operation thereof may be readily understood. My improved hay wagon is particularly useful because of the fact that the employment of an extra man to manually toss the hay from the rear of the wagon to the fore part of the wagon is unnecessary. Hay or the like picked up and deposited by a loader with which the wagon is primarily intended for use, will be dropped directly upon the platform 8 until the platform is fully loaded.

The locking pin 10 is then disengaged from the bore 11 and the lever 30 is moved against the force of the spring 32.

As the chassis continues to move forward, the pinion 21 will be driven in the same direction as the wheels 3, and the platform 8 will move to the position shown in dotted lines in Figure 1. The arm 30 may then be released and the locking pin 10 engages with the bore 12.

The loader is then employed for loading the rear portion of the chassis, and when this has been done the entire wagon has received its full load.

In unloading the wagon the load is divided by the panel into two parts. Therefore if a hay fork is employed the entire load may be moved from the wagon in two forkfuls, since there is no co-mingling of the hay as between the forward and rearward portions of the load.

I claim:

1. A hay wagon of the character described comprising a chassis having wheels, a platform slidably mounted upon said chassis, means for moving said platform forwardly, said platform disengaging with said moving means when said platform has reached its foremost position, and means for holding said platform in said position.

2. A hay wagon of the character described comprising a chassis having wheels, a platform slidably mounted upon said chassis, means for moving said platform rearwardly, said platform disengaging with said moving means when said platform has reached its rearmost position, and means for holding said platform in said position.

GEORGE PEGARIEK.